United States Patent [19]
Iida et al.

[11] 3,739,533
[45] June 19, 1973

[54] METHOD FOR OPTIMIZING TIRE UNIFORMITY

[75] Inventors: Yoshihiko Iida; Yasushi Goto, both of Tokyo, Japan

[73] Assignee: Bridgestone Tire Company Limited, Tokyo, Japan

[22] Filed: Sept. 14, 1971

[21] Appl. No.: 180,283

[30] Foreign Application Priority Data
Sept. 25, 1970 Japan.................... 45/83458

[52] U.S. Cl. .................... 51/281 R, 51/165 R
[51] Int. Cl. .................................... B24b 1/00
[58] Field of Search ............ 73/146; 51/165, 281

[56] References Cited
UNITED STATES PATENTS
3,543,576 12/1970 Bishop ............................ 73/146
3,553,903 1/1971 Christie ........................... 51/165
3,375,714 4/1968 Bottasso .......................... 73/146

*Primary Examiner*—Harold D. Whitehead
*Attorney*—Stevens, Davis, Miller & Mosher

[57] ABSTRACT

A method for optimizing the uniformity of a pneumatic tire by selectively partially removing either or both edges of tire tread shoulder rubber. The amount of the tire tread rubber being removed and the specific edge at which the rubber is removed are determined based on the measured value of lateral force deviation and/or radial force variation of the tire.

7 Claims, 16 Drawing Figures

Camber angle

Slip angle $F_1 = F_c' + F_s'$ $F_2 = F_c' - F_s'$
$LFD = (F_1 + F_2) = 2F_c'$

Grinding

Grinding

METHOD FOR OPTIMIZING TIRE UNIFORMITY

BACKGROUND OF THE INVENTION

This invention relates to a method and a device for optimizing tire uniformity, and more particularly to a method for correcting non-uniformity of pneumatic tires for automobile, especially for the sake of improving automobile directional stability.

Generally, pneumatic tires for automobiles are made by superposing layers or plies of high-molecular compounds, such as rubber and fibers, one upon the other. Steel wires are sometimes used in such pneumatic tires. With such known construction, pneumatic tires for automobiles inevitably has a certain degree of non-uniformity in the physical dimension and mechanical rigidity thereof.

More particularly, with conventional tire making processes, it has been very difficult to completely eliminate the non-uniformity in the lateral and radial dimensions of the tire and in the rigidity thereof, and hence, when an automobile with tires having such non-uniformity travels on a road, the tires are susceptible to radial and lateral runs even if the road surface is completely flat. Consequently, the driver and passengers in the automobile are likely to feel vibration due to such radial and lateral runs of the tires, which may be accompanied by noise.

What is meant by the "radial and lateral runs" refers to tire vibration in the radial directions emanating from the axis of rotation of the tire and tire vibration in the lateral direction perpendicular to a plane of the tire equator.

In the case of belted tires, radial or belted bias, the aforesaid non-uniformity of dimensions and rigidity presents additional problems due to the inevitable dissymmetry in their belt layer, which belt layer may include a breaker layer in addition to its tread layer. It is extremely difficult to provide an accurate symmetry of the geometric and dynamical disposition and the rigidity of such belt layer, relative to a plane of the tire equator as well as relative to the axis of rotation of the tire. Such dissymmetry of the belt layer causes, either by itself or in conjunction with the aforesaid non-uniformity, a lateral force acting on the tire as it rolls on road surface as if a small slip angle or camber angle were generated. Such lateral forces acting on different tires mounted on an automobile are usually different from tire to tire. Accordingly, the directional stability of the automobile is somewhat reduced due to the diversity of the aforesaid lateral forces acting on different tires thereof.

SUMMARY OF THE INVENTION

Therefore, an object of the present invention is to obviate such difficulties of conventional pneumatic tires by providing a method for optimizing the uniformity of a pneumatic tire, comprising steps of measuring the lateral force deviation (to be referred to as LFD hereinafter for brevity) of the tire by a load roll means, the direction of said lateral force deviation being perpendicular to a plane of the tire equator, and removing shoulder rubber of the tire tread from that side thereof which is opposite to the sense of the lateral force deviation thus detected, relative to said plane. The removal of the shoulder rubber may be effected soley at the aforesaid side of the tire, or at a faster rate at the aforesaid side than at the other side.

Another object of the present invention is to provide a method for optimizing the uniformity of a pneumatic tire, comprising steps of measuring the lateral force deviation of the tire together with the radial force variation (to be referred to as RFV hereinafter for brevity) thereof, producing composite signals representing both the lateral force deviation and the radial force variation thus measured, and removing the shoulder rubber of the tire in response to the composite signals.

BRIEF DESCRIPTION OF THE DRAWINGS

Like parts are designated by like numerals throughout the drawings.

DESCRIPTION OF THE PREFERRED EMBODIMENTS

Figure 1:
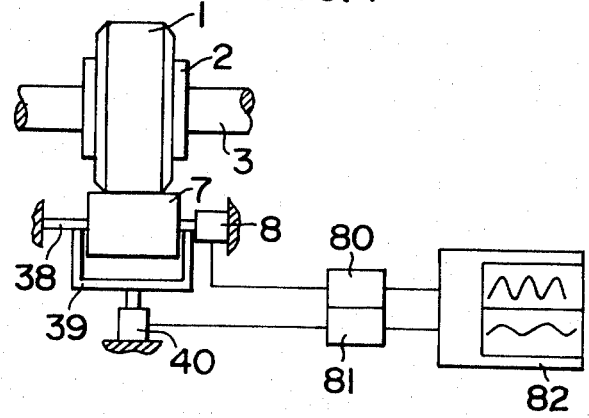
FIG. 1 is a schematic diagram of a uniformity tester for measuring the dimensional uniformity of a pneumatic tire.

The uniformity of a pneumatic tire is usually measured by a uniformity tester, as shown in FIG. 1. In the figure, a pneumatic tire 1 to be tested is mounted on a rim 2 of precise dimension, and then inflated to the rated internal pressure thereof. A load roll 7 is urged against the pnuematic tire 1 by regulating the distance between the tire axle 3 and the shaft 38 of the load roll 7, so as to apply a predetermined load on the pneumatic tire 1. Then, the position of the load roll shaft 38 is fixed relative to the pneumatic tire under test, and the pneumatic tire 1 is rotated with a constant radius of rotation.

The non-uniformity inherent to the pneumatic tire 1 causes variations in the force being transmitted to the load roll 7. The radial component, i.e., radial force variation, of such force variation, as viewed from the axis of rotation of the tire 1, is delivered to a transducer 40 through an arm 39. The transducer 40 acts to convert the radial force variation into a corresponding electric signal, which is amplified by an amplifier 81 and recorded by an oscillograph 82. The lateral component, i.e., lateral forces variation, is converted into a corresponding electric signal by another transducer 8 mounted on the shaft 38 of the load roll 7, which electric signal is recorded on the oscillograph 82 after being amplified by another amplifier 80.

The lateral force variation and radial force variation thus determined usually have a random waveform which varies from tire to tire, but the waveform has a repetitive variation with a period corresponding to one rotation of the tire.

In order to suppress the vibration and noise of vehicles due to such variation of forces related to their tires, it is desirable to limit the radial force variation and lateral force variation below a certain allowable limit. The inventors have found out through tests that the effects of lateral force variation on vehicles are far smaller than those of radial force variation thereon.

Figure 2:
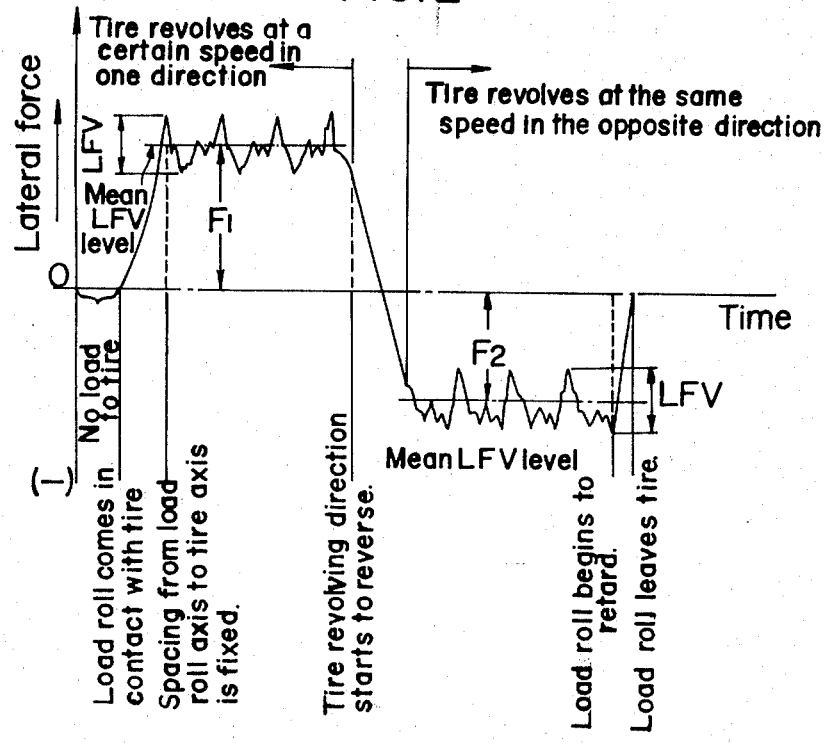
FIG. 2 is a graph illustrating typical pattern of lateral force variations (LFV) of a pneumatic tire during its rotation in both directions.

Lateral forces generated by the tire 1 can be determined by the tester of FIG. 1, for both the forward and rearward rotation of the tire. One of typical results of such measurement is shown in FIG. 2. The mean values of the lateral forces for forward and rearward rotations of the pneumatic tire are represented by $F_1$ and $F_2$, respectively. The positive (+) and negative (−) signs of FIG. 2 refer to the opposite directions relative to an equatorial plane of the tire 1, for instance, to the left and the right, respectively. Thus, it is noticed that the direction of the lateral force varies either to the left or to the right, depending on whether the pneumatic tire 1 rotates forwardly or rearwardly.

Figure 3A:
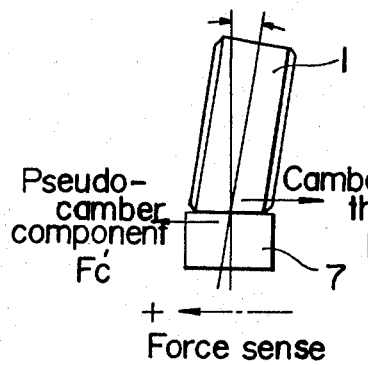
FIG. 3A is a schematic diagram, illustrating the relations between pseudo-camber component in the lateral force of FIG. 2 and the corresponding camber angle.
Figure 3B:
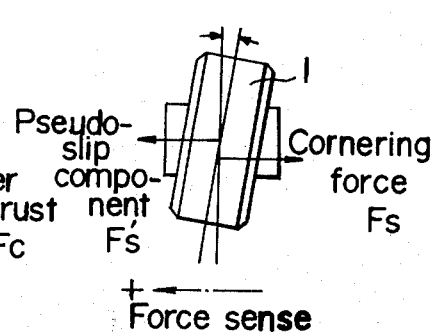
FIG. 3B is a schematic diagram, showing the relations between pseudo-slip component in the lateral force of FIG. 2 and the corresponding slip angle.

Referring to FIGS. 3A and 3B, each of the mean lateral forces $F_1$ and $F_2$ includes a component ($F_c'$) whose direction is independent of the direction of the tire rotation and another component ($F_s'$) whose direction varies depending on the direction of the tire rotation. The former component ($F_c'$) is usually referred to as "pseudo-camber component," because its behavior is similar to that of a camber thrust $F_c$ generated in response to a small camber angle applied to the tire 1, as shown in FIG. 3A. On the other hand, the latter component ($F_s'$) is usually referred to as "pseudo-slip component," because its behavior is similar to that of a cornering force $F_s$ generated in response to a small slip angle applied thereto, as shown in FIG. 3B.

The pseudo-camber component $F_c'$ is generated under the following conditions: namely, in the case of a radial tire having one or more carcass plies made of radially disposed cords, when the belt layers are dissymmetrically disposed relative to a plane of the tire equator; in the case of tires having carcasses of bias or other construction, when the thickness or the rigidity of the tread rubber is dissymmetrical relative to the plane of the tire equator; and in the latter case, when the tire pattern is dissymmetrical relative to the plane of the tire equator. The generation of the pseudo-slip component $F_s'$ is affected by the cord angle of cords in that belt ply which lies closest to the tire tread.

Figure 4A:
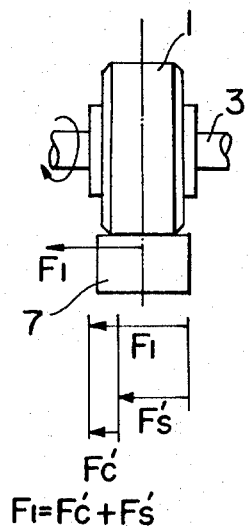
FIGS. 4A and 4B are schematic diagrams for detecting the pseudo-camber component in the lateral force, which directly relates to the lateral force deviation (LFD) of the tire.
Figure 4B:
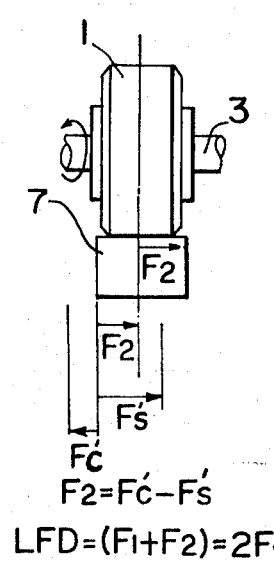

Referring to FIGS. 2 and 4, there are following relations among the mean lateral forces $F_1$, $F_2$, the pseudo-camber component $F_c'$, and the pseudo-slip component $F_s'$. (The positive (+) direction of the forces is toward the left in the figures, and the negative (−) direction of the forces is toward the right in the figures.)

$$F_1 = F_c' + F_s' \quad (1)$$

$$F_2 = F_c' - F_s' \quad (2)$$

Accordingly, $$F_c' = (F_1 + F_2)/2 \quad (3)$$

$$F_s' = (F_1 - F_2)/2 \quad (4)$$

In the foregoing description, the forces are defined as reactive forces applied to the load roll 7. If, however, such forces were defined not by the reactive forces but by active forces acting on the tire 1, the sign of the forces should be reversed.

As a result of a series of tests, it has been found that the pseudo-slip component $F_s'$ has little effect on the directional stability of vehicles, while the pseudo-camber component $F_c'$ has direct adverse effects on the vehicular directional stability. Since the pseudo-camber component $F_c'$ plays a major role in the lateral force deviation, it is frequently referred to as the "tire drift" or the "conicity." Although the lateral force deviation itself is sometimes referred to as the pseudo-camber component $F_c'$, in the following description, the lateral force deviation is defined as twice the pseudo-camber component $F_c'$ (lateral force deviation = $2F_c'$).

In order to ensure a high directional stability of vehicles, it is necessary to suppress the magnitude of lateral force deviation below a certain allowable limit by improving the accuracy in each manufacturing process for eliminating the non-uniformity. It has, however, been extremely difficult to constantly produce tires with a limited lateral force deviation, because of the variety of steps involved in the manufacture. In practice, tires with an lateral force deviation larger than $2F_c'$ have been rejected as inferior products.

For the improvement of tire quality, it has been practised to correct the dimensional non-uniformity of the tire. Such correction has been made only from the standpoint of the aforesaid radial force variation. For instance, those shoulder portions of the tire tread which are exposed to the highest load or contact pressure, by means of a grinder or a rotary cutter so as to shape the shoulder portions as close to a true circle as possible. Thereby, the magnitude of radial force variation can be minimized. It has also been practised to combine a pair of such grinders facing opposite tread shoulders with a uniformity tester mesuring the radial force variation, in such a manner that those shoulder portions which generate a high radial force variation are ground more deeply than the remainder thereof.

The aforesaid correction of the non-uniformity by grinding the selected portions of the tire tread shoulders is effective only in reducing the noise and vibration due to the dimensional non-uniformity, but it cannot solve other problems related to the non-uniformity, e.g., the stability problem is not solved by the conventional grinding approach. Thus, conventional corrective processes have been found to be not quite effective in solving all the problems related to the non-uniformity of tires.

Therefore, an object of the present invention is to obviate the aforesaid difficulties of conventional corrective processes of tire non-uniformity, by providing a method for optimizing tire uniformity based on the lateral force deviation, while setting aside the lateral force variation having little effects on the performance of vehicles. According to the present invention, it is also possible to optimize the tire uniformity based on both the lateral force deviation and the radial force variation.

Figure 5A:
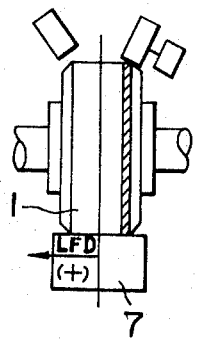
FIG. 5A and 5B are schematic diagrams, illustrating a process for correcting the non-uniformity causing such lateral force deviation (LFD)
Figure 5B:
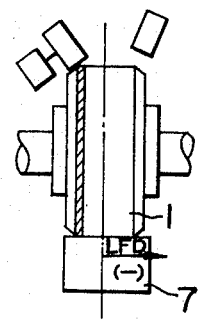

The inventor has found through experiments that the correction of lateral force deviation, which conventionally has been considered impossible, can be effected by selectively grinding one side shoulder portion of the tire in response to the magnitude of the lateral force deviation applied from the tire 1 to a load roll 7, as shown in FIGS. 5A and 5B. More particularly, the right or left shoulder of the tire tread is ground, as seen in FIGS. 5A and 5B, in response to the positive or negative direction of the lateral force deviation applied to the load roll 7 from the tire, while the depth of the grinding operation depends on the magnitude of the lateral force deviation thus detected through the load roll 7.

In addition to the aforesaid regulation of the grinding depth, it has also been found that similar effects can be achieved by grinding of one side tread shoulder into the form of a true circle, depending on the direction of the lateral force deviation. The inventor has found that similar effects can be achieved by using dissymmetrical grinding depths for the opposite tread shoulders depending on the direction of the lateral force deviation, although the use of such dissymmetrical grinding depth is not so effective as the preceding approach.

Figure 6:
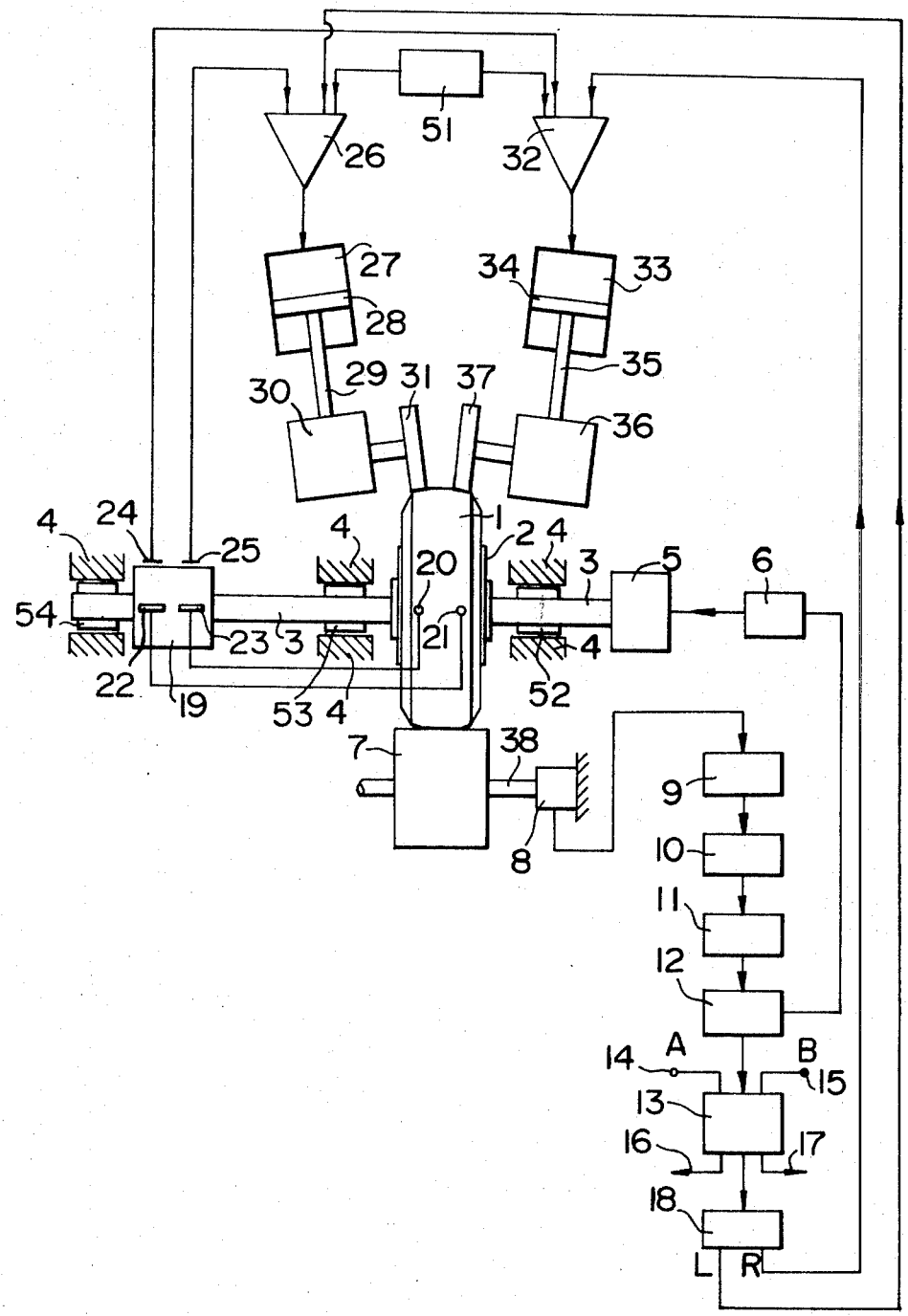
FIG. 6 is a block diagram of a device for correcting the non-uniformity causing the lateral force deviation (LFD)

The method for optimizing the tire uniformity according to the present invention will now be described in detail by referring to FIG. 6. In this figure, a tire 1 to be processed is mounted on a precision rim 2 and inflated at its rated pressure. The rim 2 is secured to a driving shaft 3 journalled by bearings 52, 53, 54 mounted on frame 4 (only partially illustrated).

A grinder reciprocating means 51 generates signals, which are amplified by servo amplifiers 26, 32 for moving the corresponding grinder wheels 31, 37 toward or away form the tire 1 being processed.

The shaft 3 is driven by a motor 5 connected to the right-hand end thereof, as seen in the figure. The revolving direction of the motor 5, and accordingly the tire 1, can selectively be controlled by a direction controller 6, in a clockwise or counter-clockwise direction. A magnetic drum 19 is mounted on the opposite end of the shaft 3, for purposes as will be described hereinafter.

Let it be assumed that the tire 1 is slowly rotated (e.g., at 12 R.P.M.) in a clockwise direction for detecting the lateral force deviation of the tire 1. Such rotation is, of course, actuated by the motor 5 under the control of the direction controller 6.

The load roll 7 is brought into contact with the tire 1 for mechanically loading the tire. The position of a load roll shaft 38 carrying the load roll 7 is adjusted relative to the tire shaft 3, and the spacing between the shafts 3 and 38 is kept at a certain distance when a desired load to the tire 1 is applied thereto. The regulation of the position of the load roll 7 can be effected by any suitable known means, so that such position control means for the load roll 7 is not shown.

The lateral force caused by the revolving tire 1 due to its lateral non-uniformity tends to shift the load roll 7 in the corresponding direction. As shown in FIG. 2, the magnitude of the lateral force is zero when the tire is not loaded. Along with the load increase, the lateral force also increases. Even if the load to the tire is kept at a certain level, by fixing the spacing between the axis of the tire shaft 3 and the axis of the load roll shaft 38, the lateral force generated by the tire revolving at a constant speed, the magnitude of the lateral force fluctuates. Such fluctuation in the lateral force is reflected in the stress acting on the load roll 7, which stress is in turn converted into electric signals by means of a transducer 8. FIG. 2 illustrates such fluctuation of the lateral force, or lateral force variation, as determined by means of the electric signals thus generated. The fluctuation of the lateral force, or lateral force variation, is periodic in its nature, and its period of fluctuation corresponds to one rotation of the tire per se.

The electric signal from the transducer 8 is amplified by an amplifier 9 and applied to a low-pass filter 10 for eliminating parasitic oscillations therefrom. The output from the low-pass filter 10 applied to a mean value calculator 11, so as to calculate the mean level $F_1$ of the lateral force during a given period of time for the rotation of the tire 1 in one direction, e.g., in a clockwise direction, as defined in FIG. 2. The mean level $F_1$ thus determined is stored in the memory portion of a lateral force deviation calculator 12.

Upon completion of the storing of the mean level $F_1$ in the aforesaid manner, the direction controlled 6 is actuated to turn the motor 5 in the opposite direction, e.g., in a counter-clockwise direction, for revolving the tire 1 at the same speed as the preceding measurement but in the opposite direction. Thus, the direction of the lateral force generated by the tire 1 is reversed, as shown in FIG. 2. Through the similar process, the mean level $F_2$ of the lateral force in the opposite direction can be determined. When the new mean level $F_2$ is applied to the memory portion of the lateral force deviation calculator 12, the new level $F_2$ is algebraically added to the previously stored level $F_1$. Accordingly, the lateral force deviation LFD is determined according to the following formula.

$$LFD = 2F_c{'} = F_1 = F_2 \qquad (5)$$

The equation (5) means that the lateral force deviation which corresponds to twice the pseudo-camber component $F_c{'}$ of the lateral force is now determined.

The direction of the lateral force deviation thus determined varies from tire to tire. For instance, the lateral force deviation directed toward the left of the load roll 7 is assumed to be plus, as seen in FIG. 6, and that electric signal from the lateral force deviation calculator 12 which represents such lateral force deviation directed to the left of the roll 7 is of positive potential relative to a reference voltage. On the other hand, lateral force deviation directed to the opposite direction is assumed to be negative and represented by an electrical signal of negative potential relative to the reference voltage.

The absolute value of the output from the lateral force deviation calculator 12 is compared with allowable levels preset in a comparator 13. More particularly, the comparator 13 has a first setting terminal 14 for setting a lower allowable limit level A and a second setting terminal 15 for setting a higher allowable limit level B. If the absolute value of the lateral force deviation from the lateral force deviation calculator 12 proves to be finite but smaller than the aforesaid lower allowable limit level A, such lateral force deviation is regarded as acceptable and no corrective steps are taken. In this case, an electric signal representing the acceptableness is applied to a terminal lead wire 16 for printing "GOOD" mark on the corresponding tire. The tires thus printed with "GOOD" marks are waived from the succeeding corrective processes.

If the absolute value of the lateral force deviation for a tire thus determined exceeds the aforesaid higher allowable limit level B, such tire is regarded as incorrigible, and an electric signal representing such incorrigibility is applied to another terminal lead wire 17 for printing "NO GOOD" mark on the tire. The tires thus printed with "NO GOOD" marks are also waived from the succeeding corrective processes.

Such marking can be carried out by any known means, so that no printing means is illustrated in the drawings.

Accordingly, tires having an lateral force deviation falling in a range from the aforesaid lower allowable limit level A to the higher allowable limit level B are subjected to the following corrective processes. In this case, the output signal from the lateral force deviation calculator 12 passes through the comparator without any modification and applied to a corrective signal generator 18. The corrective signal generator 18 produces an output signal on its terminal L or R, depending on the sign of the lateral force deviation signal from the lateral force deviation calculator 12.

The corrective processes, for instance, comprise a step of selectively partially grinding off one of the opposite tread shoulders of the tire. Referring to FIGS. 5A and 5B, the tire tread shoulder side which is to be partially ground off is determined depending on the direction of the lateral force deviation, as determined in the aforesaid manner. More particularly, if the lateral force deviation is directed to the left, as seen in FIG. 6 or 5A, and the magnitude of the absolute value of the lateral force deviation signal from the lateral force deviation calculator 12 falls in a range between the lower and higher limits A and B, the corrective signal generator 18 produces an output signal at its terminal R. Such signal at the terminal R of the lateral force deviation corrective signal generator 18 is transferred to one of the three inputs of the servo amplifier 32. The rest of the three inputs to the servo amplifier 32 are the signal from the grinder reciprocating means 51 and a signal representing the output of a displacement transducer 51 as will be described more fully in the following disclosure.

The output signal from the servo amplifier 32 controls a servo cylinder 33 in such a manner that a grinder wheel 37 grinds only the right-hand tread shoulder portion of the revolving tire 1 by a depth proportional to the magnitude of the lateral force deviation signal from lateral force deviation calculator 12. In FIG. 6, the servo cylinder 33, 27 carries a piston 34, 28, to which a connecting rod 35, 29 is secured to hold a grinder motor 36, 30 at the lower end of the rod 35, 29. The grinder wheel 37, 31 is driven by the motor 36, 30.

The grinder wheels 31 and 37 are also controlled by signals from their corresponding displacement transducers 20, 21, in addition to the aforesaid lateral force deviation corrective signal. The displacement transducers 20, 21 act to detect the deviation of the opposite shoulder portions of the tire tread from true circles, respectively. Signals from the displacement transducers 20, 21 are stored in a magnetic drum 19 secured to the tire shaft 3 by means of recording heads 22, 23. The signals thus stored are extracted from the magnetic drum 19 by means of reproducing heads 24, 25, so as to be applied to the servo amplifiers 26, 32.

A pair of erasing heads (not shown) are associated with the magnetic drum 19, so as to erase the signals stored in the magnetic head after such signals are extracted by the reproducing heads 24, 25.

The magnetic drum 19 is used for the compensation of the positional deviation between the displacement converter 20, 21 and the grinder wheel 31, 37, by providing a time lag in the signal from the converter.

The purpose of measuring the deviation of the tread shoulders from the true circle and using signals representing such deviation as feedback signals to the grinder wheel control mechanism is to compensate for the inevitable undulation in the peripheral surface of the tire tread. More particularly, the use of the feedback signals has dual purposes; namely, when no lateral force deviation corrective signals are applied to the grinder wheel control mechanism, a certain spacing is provided from the grinder wheels 31, 37 to the tire 1 for preventing the tire grinding due to such undulation of the tire tread; and when the lateral force deviation corrective signals are applied to the grinder control mechanism, the grinding is effected so as to grind a certain constant depth, regardless of the aforesaid undulation of the tire tread.

According to the present invention, it is possible to optimize the tire uniformity without using the signals representing the deviation of the tire tread from true circles. In this case, the correction is made by grinding the tire tread into truly circular cross section. The inventors have found that the efficiency of the correction without the feedback signals representing the deviation from true circles is somewhat lower than that of the invention.

When the tire thread is ground by a certain predetermined depth by the grinder wheels 31 and/or 37, the corrective signal generator 18 ceases to generate outputs to its terminals L and R. Thus, the grinder wheels 31 and 37 retreat to positions spaced from the tire 1.

Thereafter, the lateral force deviation of the tire is measured again. If the lateral deviation thus measured proves to be smaller than the aforesaid lower allowable limit level A, the comparator 13 produces an output signal to its terminal lead wire 16, so that a "GOOD" mark is printed on the tire and the load roll 7 retard from the tire 1 while separating the grinder wheels 31, 37 by means of the grinder reciprocating means 51. Thus, the tire 1 is ready for removal from the corrective device of FIG. 6.

Figure 7:
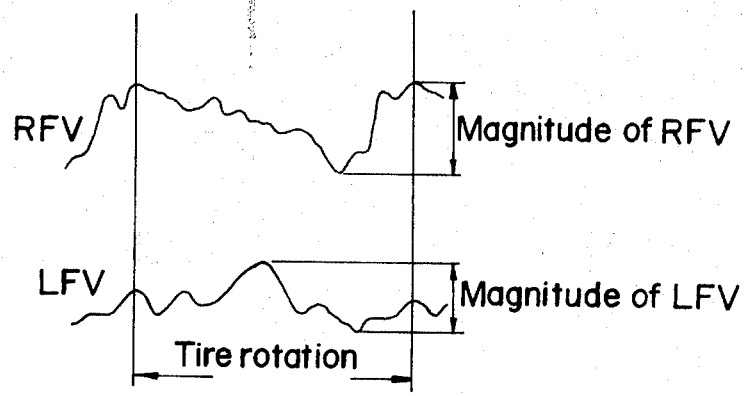
FIG. 7 is graph, illustrating a typical pattern of radial force variation (RFV), as measured together with the lateral force variation (LFV) of FIG. 2.

The correction from the standpoint of lateral force deviation has been described. It is another feature of the present invention that the tire uniformity can also be improved by using the radial force variation in conjuction with the lateral force deviation. The transducer 40 of the uniformity tester of FIG. 1 acts to generate signals representing the radial force variation, as shown in FIG. 7. According to a conventional practice, those portions of the tire tread which correspond to large radial force variation are ground by actuating a suitable grinder in response to signals representing such radial force variation, so as to remove more rubber at positions where the radial force variation is larger. It has been troublesome and inefficient to make correction in two steps; namely, one step for lateral force deviation and another step for radial force variation.

Figure 8:
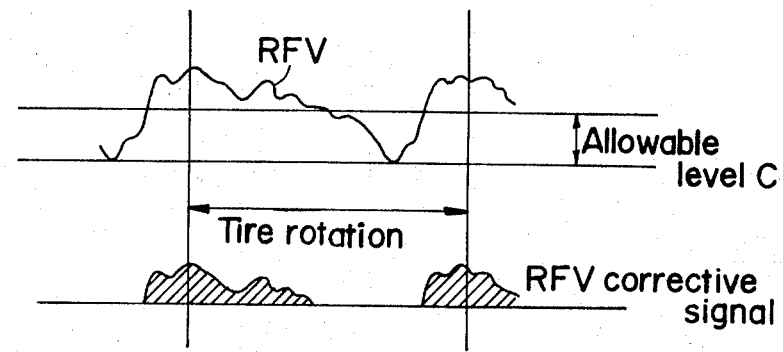
FIG. 8 is a graph, illustrating typical radial force variation (RFV) corrective signals, which are generated in response to the pattern of radial force variation (RFV) of FIG. 7.
Figures 9A, 9B:
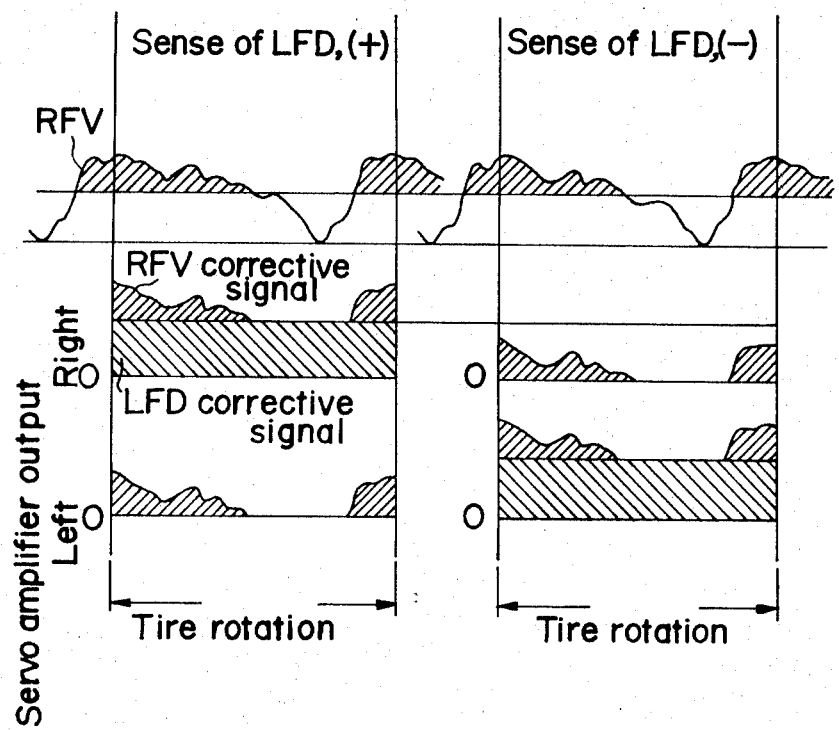
FIGS. 9A and 9B are graphs, showing simultaneous lateral force deviation (LFD) and radial force variation (RFV) corrective signals.

According to the present invention, the correction for both the lateral force deviation and the radial force variation can simultaneously be effected. Referring to FIG. 8, a signal representing the radial force variation is compared with a certain predetermined allowable level, for generating radial force variation corrective signals which correspond to positive portions in the differential between the radial force variation and the allowable level. As shown in FIGS. 9A and 9B, the radial force variation corrective signals are algebraically added to the aforesaid lateral force deviation corrective signals for producing composite signals, while considering the sense of the lateral force deviation. With such composite signals, it is possible to grind the tire tread shoulder rubber in one step based on both the radial force variation and the lateral force deviation.

Figure 10:
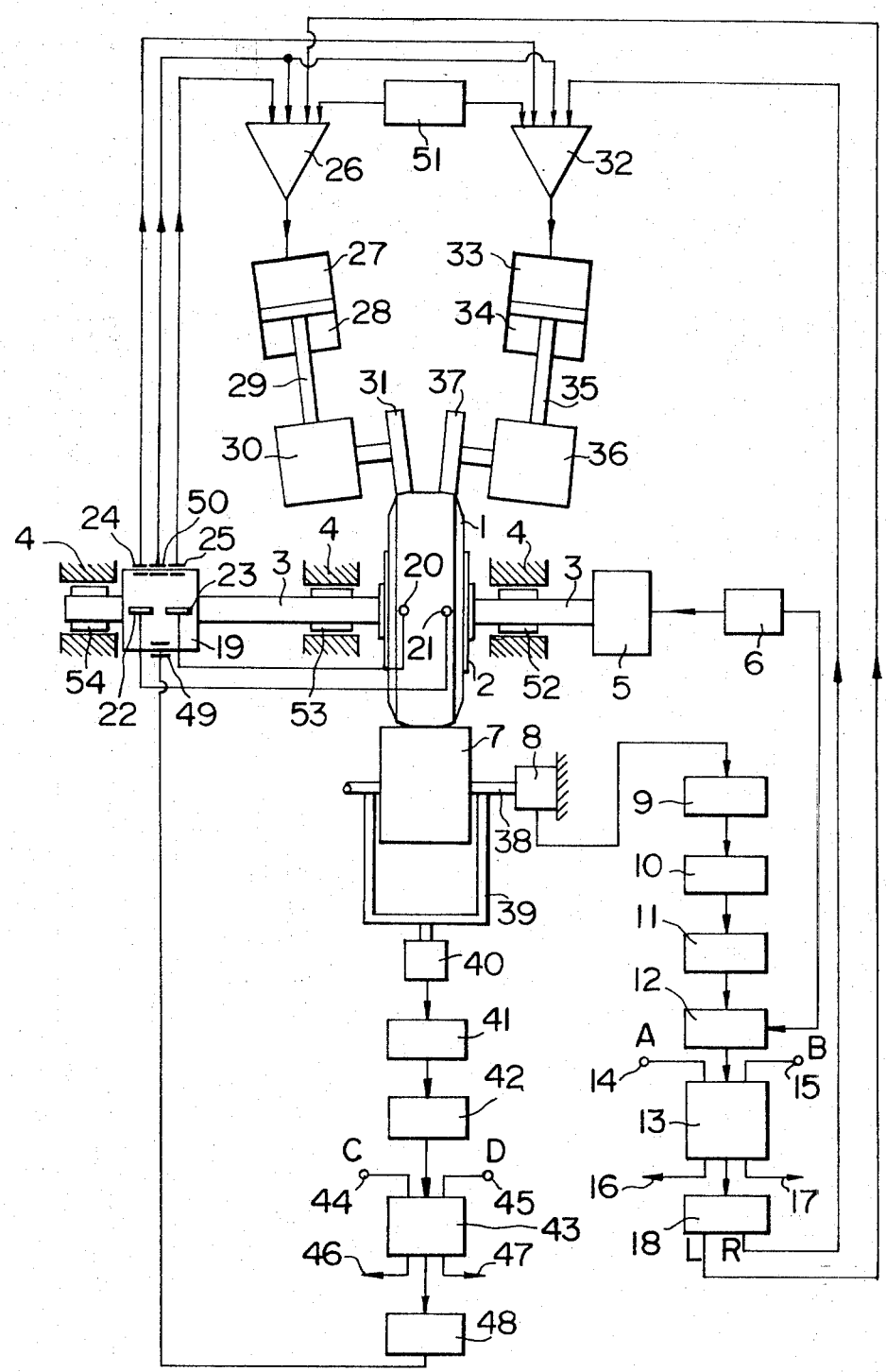
FIG. 10 is a block diagram of a device for effecting simultaneous corrections in response to both the lateral force deviation (LFD) and radial force variation (RFV) corrective signals.

FIG. 10 schematically illustrates an embodiment of a device for simultaneously correcting the tire non-uniformity for both the radial force variation and the lateral force deviation, based on the aforesaid principles according to the present invention. In this embodiment, a tire 1 to be treated is rotatably supported on a rim 2 secured to a tire shaft 3 journalled by a frame 4, so as to be engageable with a load roll 7, in a manner similar to the preceding embodiment.

A grinder reciprocating means 51 acts to bring grinder wheels 31, 37 toward the tire 1, so as to cause the grinder wheels 31, 37 to selectively engage the tread shoulder portions of the tire 1. Such engagement of the grinder wheels 31, 37 with the tire tread shoulder portions is actuated in response to signals from a corrective signal generator 18, which responds to the lateral force deviation signals detected by the load roll 7 and produced by a transducer 8, as described in detail in the foregoing by referring to FIG. 6.

Along with the aforesaid mesurement of the lateral force deviation, the non-uniformity of the tire 1 revolving in one direction, e.g., in a counter-clockwise direction, is detected as the radial force variation by the load roll 7 and delivered to a transducer 40 through an arm 39 for conversion into corresponding electric signals.

The electric signals from the transducer 40 are amplified by an amplifier 41, and then applied to a low-pass filter 42 for eliminating parasitic oscillation thereof.

The magnitude of the output from the low-pass filter 42 is compared with allowable levels preset in a comparator 43. More particularly, the comparator 43 has a first setting terminal 44 for setting a lower allowable limit level C and a second setting terminal 45 for setting a higher allowable limit level D. If the magnitude of the radial force variation proves to be finite but smaller than the aforesaid lower allowable limit level C, such radial force variation is regarded as acceptable and no corrective steps are taken. In this case, an electric signal representing the acceptableness is applied to a terminal lead wire 46 for printing "RFV-GOOD" mark on the corresponding tire. The tires thus printed with "RFV-GOOD" marks are waived from the succeeding corrective processes.

If the magnitude of the radial force variation for a tire thus determined exceeds the aforesaid higher allowable limit level D, such tire is regarded as incorrigible, and an electric signal representing such incorrigibility is applied to another terminal lead wire 47 for printing "RFV NO GOOD" mark on the tire. The tires thus printed with "RFV NO GOOD" marks are also waived from the succeeding corrective processes.

Such marking can be carried out by any known means, so that no printing means is illustrated in the drawings.

Accordingly, tires having a radial force variation falling in a range from the aforesaid lower allowable limit level C to the higher allowable limit level D are subjected to the following corrective processes. In this case, the output signal from the low-pass filter 42 passes through the comparator 43 without any modification and applied to a radial force variation corrective signal generator 48. The corrective signal generator 48 produces an output signal on its output terminal, which output signal corresponds to a difference obtained by subtracting the lower allowable limit level C from the radial force variation signal from the low-pass filter 42, as shown in FIG. 8.

The output signal from the radial force variation corrective signal generator 48 is applied to a recording head 49 recording in a magnetic drum 19. The signal thus stored is extracted from the magnetic drum 19 by means of a reproducing head 50.

The purpose of passing the signal from the radial force variation signal generator 48 through the magnetic drum 19 is to compensate for the positional difference between the load roll 7 for detecting the radial force variation and the grinder wheels 31, 37, or to compensate for the the time lag therebetween.

The radial force variation corrective signals thus reproduced by the reproducing head 50 is simultaneously applied to two servo amplifiers 26 and 32. Each servo amplifier 26 or 32 acts to superpose three input signals; namely, the radial force variation corrective signal thus reproduced by the reproducing head 50, lateral force deviation corrective signal from the lateral force deviation corrective signal generator 18, and displacement signals generated by a displacement transducer 20 or 21 and applied to the servo amplifier through the magnetic drum 19 in the aforesaid manner by referring to the system of FIG. 6. Consequently, as long as the output from the displacement transducers 20 and 21 are different, and as long as the output signals at the output terminal L and R are different from each other, the composite signals at the output terminals of the servo amplifiers 26 and 32 are different from each other.

The output signals from the servo amplifiers 26 and 32 are applied to the corresponding servo cylinders 27 and 33, respectively, for selectively grinding the tread shoulder portions of the revolving tire 1 by means of the grinder wheel 31 and/or 37.

The composite output signals from the servo amplifiers 26 and 32 are shown in FIGS. 9A and 9B, respectively. With such composite signals, the grinder wheels 31 and 37 are controlled in such a manner that the correction of the non-uniformity of the tire 1 can be effected simultaneously both for the radial force variation and the lateral force deviation.

It is apparent that when only one of the two comparators 13 and 43 produces the output signal representing the corrigibility or the need of correction of the tire in either lateral force deviation or radial force variation, the correction of the non-uniformity of the tire will be effected in response to either lateral force deviation or radial force variation corrective signals.

If both the lateral force deviation and the radial force variation are found to be below the respective lower allowable limit levels A and C by the comparators 13 and 43, marks representing its acceptableness from the standpoint of uniformity is printed on the tire 1, and then the tire 1 is removed from the correcting device. When both of the lateral force deviation and the radial force variation are found to exceed the corresponding upper allowable limit levels B and D, other marks representing the incorrigibility of the tire from the standpoint of uniformity are printed on the tire 1, and the tire 1 is removed from the correcting device.

During the simultaneous correction for both the lateral force deviation and the radial force variation, the magnitude of the radial force variation is continuously monitored by the load roll 7 while the tire 1 is being ground. As soon as the comparator 43 detects that the radial force variation is reduced below the allowable limit level C, the comparator 43 acts to prevent the passage of the signal from the low-pass filter 42. Accordingly, the radial force variation corrective signal generator 48 produces no output signals. As a result, the correction of the non-uniformity from the standpoint of the radial force variation ceases. At this moment, if the lateral force deviation corrective signal generator 13 still continues to generate output signals, only the lateral force deviation correction will take place, until the lateral force deviation becomes less than the lower allowable limit level A when the generation of output signals from the lateral force deviation corrective signal generator 18 ceases. When both of the signal generators 18 and 48 cease to generate output signals, the servo amplifiers 26 and 32 receive no active input signals, so that the grinder wheels 31, 37 retreat to a position in the proximity of the tire 1. Thereafter, the aforesaid marking takes place on the tire to indicate its acceptableness, and the grinder wheels 31, 37 are further moved away from the tire 1 by the grinder reciprocating means 51, for clearing the way for removing the tire 1 from the correcting device.

The invention will now be described in further detail by referring to Examples.

EXAMPLE 1

The relation between the lateral force deviation of tires and the deviation of tire belt layers relative to the equatorial plane of the tires was measured by using the following tire specimens.

Properties of tire specimens:
Size: 7.00 – 13
Tread width: 114 mm
Breaker: 3 plies reinforced by stranded steel cords, each having an outside diameter of 0.71 mm and consisting of strands of 0.15 m dia.

| Ply | ply width (mm) | Cord angle, relative to the equatorial direction |
|---|---|---|
| Tread side ply | 105 | 20°, left |
| Intermediary ply | 95 | 20°, right |
| Carcass side ply | 115 | 85°, right |

Figure 11:
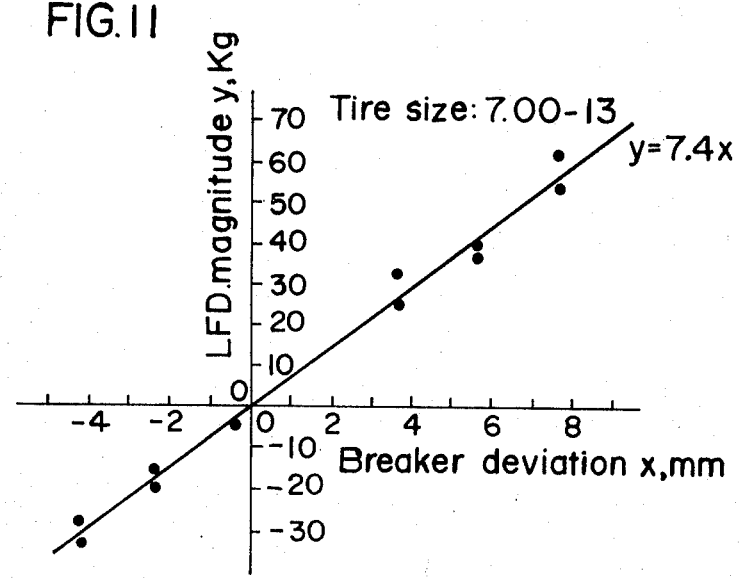
FIG. 11 is a graph, showing the relation between the magnitude of breaker deviation and the lateral force deviation (LFD) magnitude.

Carcass: 2 rayon-corded plies, each rayon cord consisting of two 1650 denier rayon yarns, cord angle of 90°.
Test conditions: Tire inner pressure, 1.7 Kg/cm$^2$;
Load roll diameter: 254 mm The results are shown in FIG. 11. It is apparent from the figure that the nagnitude of lateral force deviation increases in proportion to the aforesaid deviation of the breaker.

Figure 12:
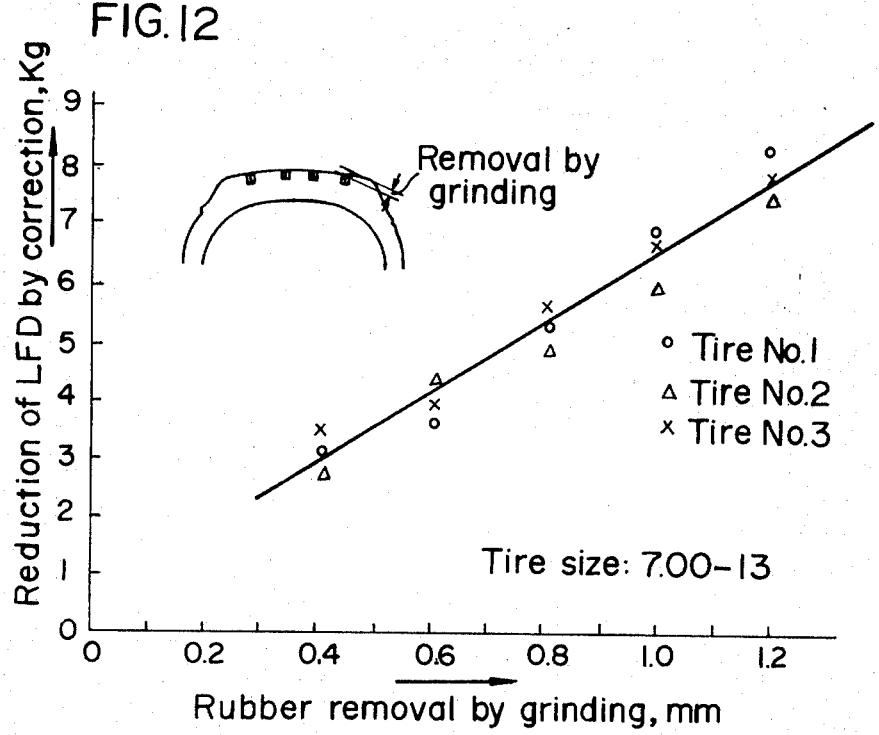
FIG. 12 is a graph, illustrating the relation between the amount of rubber removal and the reduction of lateral force deviation (LFD) due to such rubber removal.

Three tire specimens which had a lateral force deviation of about 15 Kg were selected from the aforesaid specimens. Depending on the sense of the lateral force deviation, one edge portion of the tire tread, namely from one edge of the tire tread to those ends of tread grooves which were closest to said tire tread edge, were gradually ground in different depths in a range of 0.4 to 1.2 mm depth, based on the principles of FIGS. 5 and 6. The relation between the reduction of the lateral force deviation and the depth of the tire tread grinding was measured. The results are shown in FIG. 12. The ordinate of the graph of FIG. 12, namely, the reduction of lateral force deviation, was determined as the difference of the lateral force deviation before and after the aforesaid grinding.

EXAMPLE 2

Out of the tire specimens of Example 1, 5 specimens were selected which had a lateral force deviation of 14.0 to 15.5 Kg and a radial force variationn of 10.5 to 12.5 Kg, so as to carry out the simultaneous grinding thereon by using both the lateral force deviation and the radial force variation corrective signals, based on the principles of FIGS. 9A, 9B, and 10. The results are shown in Table 1.

TABLE 1

| Specimen No. | | 1 | 2 | 3 | 4 | 5 |
|---|---|---|---|---|---|---|
| Before | LFD* | 15.0 | 15.5 | 14.5 | 14.0 | 15.5 |
| grinding | RFV** | 12.0 | 12.5 | 11.0 | 10.5 | 11.5 |
| After | LFD | 10.0 | 10.0 | 9.0 | 9.5 | 10.5 |
| grinding | RFV | 7.5 | 8.0 | 7.0 | 7.0 | 8.5 |
| Effective | LFD | 5.0 | 5.5 | 5.5 | 4.5 | 5.0 |
| correction | RFV | 4.5 | 4.5 | 4.0 | 3.5 | 3.0 |

* LFD stands for lateral force deviation.
** RFV stands for radial force variation.

In this Example, the depth of the grinding was limited to be less than 1.5 mm, of which 0.8 mm was allowed for the lateral force deviation correction on either side tread edge, while 0.7 mm was allowed for the radial force variation correction on both side tread edges.

As described in the foregoing disclosure, according to the method of the present invention, it is made possible to improve the stability of a pneumatic tire and to reduce its vibration and noise after regular production of the tire, by effectively correcting the lateral force deviation and radial force variation experienced during its operation due to the inevitable non-uniformity of its dimensions and physical properties. It is economically impractical to completely eliminate such non-uniformity in the process of regular production. The method of the present invention is also effective in reducing defective products by simple correction, so as to improve the overall efficiency of the tire making process.

The present invention has been described by way of examples, but the scope of the invention is not limited to the illustrated embodiment. For instance, the magnitude of the lateral force deviation and radial force variation may be determined by using any suitable means other than the illustrated load roll; the sence of the lateral force deviation may be defined by the reaction from the load roll rather than by the force generated from the tire; the electric control of the grinder wheels may be modified from what is illustrated; and the detailed construction of the various mechanical parts in the illustrated embodiment is nothing but a matter of choice by designers. If the control signals related to the grinding of a pneumatic tire for correction of its nonuniformity, based on the lateral force deviation and radial force variation, are stored in a suitable memory device, the grinding devices may be located at a position different from the measurement of the lateral force deviation and radial force variation, and the timing of such correction may be selected in any suitable manner.

What is claimed is:

1. A method for optimizing the uniformity of a pneumatic tire comprising:
   mounting the pneumatic tire on a rotatable rim,
   inflating the pneumatic tire at a predetermined internal pressure,
   applying a predetermined external load to the pneumatic tire,
   rotating the tire about an axis of rotation of the rim together with the rim,
   measuring lateral force deviation of the tire while rotating the tire, the direction of said lateral force deviation being perpendicular to a plane of the tire equator, and
   removing shoulder rubber of the tire from that side thereof which is opposite to the sense of the lateral force deviation thus detected, relative to said plane, the amount of said shoulder rubber removal being related to the magnitude of said lateral force deviation.

2. A method for optimizing the uniformity of a pneumatic tire according to claim 1, wherein the shoulder rubber of the tire is removed more at the side opposite to the sense of the lateral force deviation than at the side of said sense of the lateral force deviation, the difference of the rubber removal between the two sides being related to the magnitude of the lateral force deviation.

3. A method for optimizing the uniformity of a pneumatic tire, comprising:
   mounting the pneumatic tire on a rotatable rim,
   inflating the pneumatic tire at a predetermined internal pressure,
   applying a predetermined external load to the tire,
   rotating the tire about an axis of rotation of the rim together with the rim,
   measuring lateral force deviation and radial force variation of the tire, the direction of the lateral force deviation being perpendicular to a plane of the tire equator, the direction of the radial force variation being radial about the axis of rotation of the tire, producing composite signals representing the magnitudes of both the lateral force deviation and the radial force variation thus measured, and
   removing the shoulder rubber of the tire in response to the composite signals.

4. A method for optimizing the uniformity of a pneumatic tire comprising:
   mounting the pneumatic tire on a rotatable rim,
   inflating the pneumatic tire at a predetermined internal pressure,
   applying a predetermined external load to the tire,
   rotating the tire about an axis of rotation of the rim together with the rim,
   measuring lateral force deviation, the direction of the lateral force deviation being perpendicular to a plane of the tire equator;
   generating lateral force deviation corrective signals whose magnitude being proportional to the magnitude of the lateral force deviation thus measured, the lateral force deviation corrective signal being positive for the lateral force deviation directed to a first side of said plane while the lateral force deviation corrective signal being negative for the lateral force deviation directed to a second side of said plane opposite to said first side;
   measuring the radical force variation along with said lateral force deviation, the direction of the radial force variation being radial relative to the axis of rotation of the tire;
   generating radial force variation corrective signals whose magnitude corresponds to the difference between the radial force variation thus determined and a predetermined maximum allowable limit for radial force variation, the sense of the radial force variation corrective signal being positive relative to a reference potential;
   generating two composite signals consisting of a first composite signal representing the sum of said radial force variation corrective signal and positive part of said lateral force deviation corrective signal and a second composite signal representing the sum of the radial force variation corrective signal and the absolute value of the negative portion of said lateral force deviation corrective signal; and
   grinding the first and second side shoulder edges of the tire tread in response to said second and first composite signals, respectively.

5. A method for optimizing the uniformity of a pneumatic tire according to claim 1, wherein the lateral force deviation is measured by using a load roll.

6. A method for optimizing the uniformity of a pneumatic tire according to claim 4, wherein the lateral force deviation and the radial force variation are measured by using a load roll.

7. A method for optimizing the uniformity of a pneumatic tire according to claim 4, wherein the grinding of the opposite edges of the tire tread shoulder is effected by a pair of grinder wheels which are controlled in response to said first and second composite signals, respectively.

* * * * *